United States Patent [19]

Pechter

[11] Patent Number: 5,317,706

[45] Date of Patent: May 31, 1994

[54] MEMORY EXPANSION METHOD AND APPARATUS IN A VIRTUAL MEMORY SYSTEM

[75] Inventor: Richard G. Pechter, Escondido, Calif.

[73] Assignee: NCR Corporation, Dayton, Ohio

[21] Appl. No.: 97,725

[22] Filed: Jul. 26, 1993

Related U.S. Application Data

[63] Continuation of Ser. No. 437,050, Nov. 15, 1989, abandoned.

[51] Int. Cl.$^5$ ............... G06F 12/02; G06F 12/06; G06F 12/10
[52] U.S. Cl. ............................ 395/400; 364/256.3; 364/DIG. 1; 364/246.97; 364/961.2; 364/DIG. 2; 364/964.9; 395/425
[58] Field of Search ... 364/200 MS File, 900 MS File; 395/400, 425

[56] References Cited

U.S. PATENT DOCUMENTS

| | | | |
|---|---|---|---|
| 3,251,040 | 5/1966 | Burkholder et al. | 395/275 |
| 3,854,126 | 12/1974 | Gray et al. | 395/400 |
| 3,949,378 | 4/1976 | Crabb et al. | 395/400 |
| 3,970,999 | 7/1976 | Elward | 395/400 |
| 3,972,025 | 7/1976 | Taddei | 395/425 |
| 3,976,976 | 8/1976 | Khosharian | 395/425 |
| 4,042,911 | 8/1977 | Bourke et al. | 395/425 |
| 4,118,773 | 10/1978 | Raguin et al. | 395/425 |
| 4,164,786 | 8/1979 | Gollomp | 395/425 |
| 4,340,932 | 7/1982 | Bakula et al. | 395/425 |
| 4,346,441 | 8/1982 | Plank et al. | 395/425 |
| 4,355,355 | 10/1982 | Butwell et al. | 395/400 |
| 4,361,868 | 11/1982 | Kaplinsky | 395/400 |
| 4,403,283 | 9/1983 | Myntti et al. | 395/425 |
| 4,434,459 | 2/1984 | Holland et al. | 395/375 |
| 4,453,212 | 6/1984 | Gaither et al. | 395/400 |
| 4,473,877 | 9/1984 | Tulk | 395/425 |
| 4,500,962 | 2/1985 | Lemaire et al. | 395/425 |
| 4,546,451 | 10/1985 | Bruce | 395/425 |
| 4,554,627 | 11/1985 | Holland et al. | 395/375 |
| 4,658,350 | 4/1987 | Eggebrecht et al. | 395/425 |
| 4,761,736 | 8/1988 | Di Orio | 395/425 |
| 4,796,177 | 1/1989 | Nishimura et al. | 395/400 |
| 4,805,092 | 2/1989 | Cerutti | 395/400 |
| 4,891,752 | 1/1990 | Fairman et al. | 395/425 |
| 4,969,086 | 11/1990 | Pfeiffer et al. | 395/200 |
| 5,038,282 | 8/1991 | Gilbert et al. | 395/200 |

OTHER PUBLICATIONS

M. Morris Mano, Computer System Architecture, 1982, Second Edition, pp. 206–212.

"The Atari 800 Plus 256K Memory Modification Installation Manual for the Atari 800 Home Computer" as Originally Documented by David G. Byrd, Pub. 1985.

Primary Examiner—Joseph L. Dixon
Assistant Examiner—Matthew Kim
Attorney, Agent, or Firm—James M. Stover

[57] ABSTRACT

An apparatus for extending the memory of an electronic data processing system and a method for providing access to the extended memory for reading data, writing data, and refreshing data. The method provides a partitioning of the original virtual address space into a reduced virtual address space and an extended real memory address space. An extended address register is loaded initially with an extended memory control word by the operating system, but this word may not be changed again until the current process is over. If this control word is changed, it is changed by the operating system such that the use of the extended memory is transparent to the application processes using the system. The method further provides for refreshing of the memory circuitry of the extended memory. The apparatus supports the extended real memory address space by decoding the read and write accesses to the extended real address space, and by providing electrical connections for the refreshing of the extended memory circuitry. Thus, with this apparatus and method, the real memory of an electronic data processing system may be multiplied by a factor of two, four, or some higher multiple of two.

10 Claims, 6 Drawing Sheets

FIG. 5

| Bit | Field |
|---|---|
| LSB 1 | STOR0 EX1 |
| | STOR0 EX2 |
| | NOT USED |
| | STOR1 EX1 |
| | STOR1 EX2 |
| | NOT USED |
| | STOR2 EX1 |
| | STOR2 EX2 |
| | NOT USED |
| | STOR3 EX1 |
| | STOR3 EX2 |
| | NOT USED |
| | STOR4 EX1 |
| | STOR4 EX2 |
| | NOT USED |
| | STOR5 EX1 |
| | STOR5 EX2 |
| | NOT USED |
| | STOR6 EX1 |
| | STOR6 EX2 |
| | NOT USED |
| | STOR7 EX1 |
| | STOR7 EX2 |
| | NOT USED |
| | REAL EX1 |
| | REAL EX2 |
| | IEEE 796 EX1 |
| | IEEE 796 EX2 |
| | DIAGNOSTIC |
| | DIAGNOSTIC |
| | DIAGNOSTIC |
| MSB 32 | DIAGNOSTIC |

MEMORY EXPANSION METHOD AND APPARATUS IN A VIRTUAL MEMORY SYSTEM

This is a continuation of application Ser. No.07/437,050, filed Nov. 15, 1989, now abandoned.

BACKGROUND OF THE INVENTION

The present invention relates to an electronic data processing system and more particularly to a memory expansion apparatus for a virtual memory electronic data processing system, as well as, a method for operating the apparatus.

A common problem experienced by users of electronic data processing systems is for the main memory requirement of a given system to grow with time. This common problem stems from the natural tendency of data files used in data bases and/or spreadsheets to grow with time, and the tendency for application programs to grow in size and number as the system evolves. This problem is evidenced by the conventional wisdom for a purchaser to purchase a system that has a memory which may be expanded to at least fifteen per-cent above the maximum memory requirement at the time of purchase. But even when the conventional wisdom is heeded, a user may find a need for expanding system main memory beyond the original maximum memory capacity. Thus, there is a need for the capability to expand the main memory of a system beyond its original maximum capacity.

Further, when the system memory is expanded beyond its original limit, it is highly desirable that any and all application programs, which are currently being used on an unexpanded system, function well on any expanded system. The functioning of the application programs is important from two aspects: cost and performance. If substantial changes need to be made to an application program, expenses will be incurred during a reprogramming. Secondly, the performance of an expanded memory system, in order to be commercially competitive, should be equivalent to or greater than the performance of an unexpanded system.

In a real memory system, where the memory address corresponds to an actual location in read only memory or random access memory, the maximum memory limit usually corresponds to the summation of all addresses below the maximum address accessible by the processor-memory bus. In a system with a sixteen bit processor-memory bus, this maximum would be 65536 when addressing is performed directly in one access cycle. A twenty bit address bus, which is common on most personal computers, would have a maximum of 1,048,576 address locations available directly in one access cycle. This does not mean that these systems cannot have memory capacity greater than that which is addressable in one cycle. In fact, many ways have been devised to expand available memory beyond the maximum memory capacity which is addressable in one access cycle.

It is known to add expanded memory locations, by the addition of either higher capacity memory chips or more memory chips, and to concomitantly add additional parallel address lines to the processor-memory bus in order to address the expanded memory. The known system has a segment register which has segment values of 0 to 15, but as originally supplied the equipment only uses three of the sixteen possible segments to read/write data and instructions into memory. Thus, by adding additional address bus lines and control circuitry, which utilizes the unused and available segment values, the maximum addressable real memory of the known system is expanded from 64 kilobytes (where 1 kilobyte=$2^{10}$ or 1024 bytes) to 288 kilobytes. The expansion to the 288 kilobyte real memory capacity of the segment register reached the hardware and software limit. Expansion beyond this limit is not possible without changing the software and incurring a degradation of performance, or changing the processor integrated circuits to ones with larger address buses (which is not economically feasible).

Another known approach for expanding memory capacity beyond the maximum real memory limit is to change the architecture of the system to that of a paged memory system where a page register keeps track of the current page. Paged memory systems typically have one or more banks of real memory with each bank having at least one page, and each page having one or more segments. Expanded addresses are possible because of extra bits which are stored in a page register. But, this type of paging requires the loading of the page register whenever a new page of real memory is used. The loading of the page register takes another write cycle and thereby degrades system performance.

An example of a system which needs to be expanded or extended beyond its original maximum is the NCR System 10000 Model 75. The NCR System 10000 Model 75 system design is generally shown and described in NCR/32 GENERAL INFORMATION MANUAL, published in 1984 by NCR Corporation, Dayton, Ohio, which manual is hereby incorporated by reference. As originally designed, the System 10000 Model 75 has a design maximum of 16 million bytes. This may seem to be a large amount of memory, but this is a 32 bit system, and 16 million bytes is not exceedingly large for such a system. Further, this system stores and retrieves information as four byte words. Thus, this system as originally designed has a maximum of 4 million words. Additionally, the 4 million words may be shared between two dyadic processors, thereby lowering the design maximum memory per processor to 2 million words.

Since the NCR System 10000 is a virtual memory system, performance degrades somewhat when a real memory limit is reached because the virtual operating system must clear an address space in real memory to load the next program from virtual memory by writing the current contents of that address space to virtual memory (i.e. disk memory). This writing of a previous program to disk memory and reading of a current program from disk memory to real memory degrades performance. The more virtual memory writing and reading that takes place between disk and real memory, the lower the performance becomes.

It is therefore an object of the present invention to provide an extended addressable real memory to a virtual system which has already reached its maximum real memory limit.

It is another object of this invention to provide an extended real memory without significantly degrading the operation of the virtual system.

It is a further object of this invention to provide extended real memory in a virtual memory system to prevent performance degradation caused by program transfers between virtual memory and real memory.

SUMMARY OF THE INVENTION

Briefly stated, in accordance with one aspect of the invention, the foregoing objects are achieved by providing an extended memory circuit for a virtual memory address system having one or more banks of extended memory beyond the original maximum addressable memory bank. This extended memory is logically located or mapped to a portion of the original virtual address space which previously had been accessed by virtual memory operations. This mapping is accomplished by loading a control word having groups of most significant bits into an extended memory register. After the control word is stored in the register, a multiplexer selects one of the groups of most significant bits according to a control field of each address transmitted on the address bus by the processor. The most significant bits selected by the multiplexer provide the bank selection address to the original or one of the additional memory banks.

In a specific embodiment, the above objects are achieved by providing a memory expansion apparatus for use in a virtual memory system, including a processor with an address bus, a data bus, and a control bus. Connected to the address bus, the control bus and the data bus is an external register which stores an extended address control word from the processor via the data bus. An extended address selector is connected to the address bus and to the external register for selecting a plurality of extended address bits from the extended address control word according to a current virtual address from the address bus, as an extended address. The extended address is outputted to a memory interface, which interface is also connected to the address bus, the control bus, the data bus, and the extended address selector. The memory interface multiplexes row address bits and column address bits from the address bus to row address lines and column address lines of a main memory and uses the extended address to select one of the plurality of memory banks, at least one of which is an extended address memory bank.

In another aspect of the invention, the aforementioned objects are achieved by providing an extended memory apparatus as described in the previous paragraph, further including an extended memory refresh circuit for refreshing the extended memory banks beyond the original design maximum.

In yet another aspect of the invention, the aforementioned objects are achieved by providing a method for accessing an extended memory using portions of a preselected extended memory control word as a memory bank selector.

BRIEF DESCRIPTION OF THE DRAWINGS

While the specification concludes with the appended claims particularly pointing out and distinctly claiming the subject matter which is regarded as the invention, it is believed that the invention will be better understood from the following detailed description of the illustrative embodiment taken in conjunction with the accompanying drawings in which:

FIG. 5 is an illustration of an allocation of a thirty-two bit extended address register.

DESCRIPTION OF A PREFERRED EMBODIMENT

Figure 1:
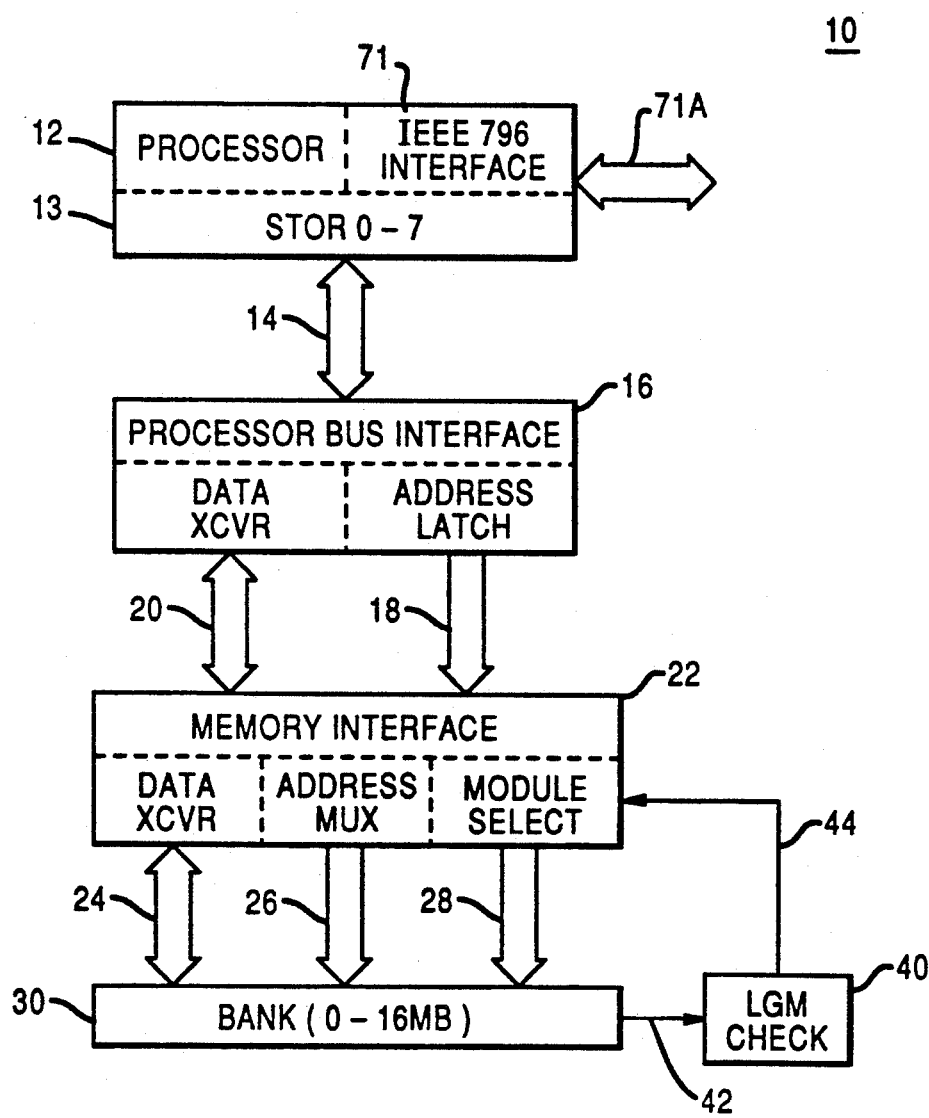
FIG. 1 is a simplified block diagram of an NCR SYSTEM 10000 Model 75 electronic data processing system, as originally designed.

FIG. 1 is a simplified block diagram showing the primary functional blocks of a system 10, such as a NCR SYSTEM 10000 Model 75, and the interconnections of those functional blocks. A processor 12, such as a processor using a NCR/32 chip set including a NCR/32-000 central processor chip and a NCR/32-010 address translation chip as described in NCR/32 GENERAL INFORMATION MANUAL, published by NCR Corporation, Dayton, Ohio in 1984, which is hereby incorporated by reference, provides the primary control for the system 10. The processor 12 has a group of eight internal registers which are used for memory management during virtual memory operations. These registers are called segment table origin registers (STOR 0-7) 13. The processor 12 is connected to a processor bus interface 16 via a bi-directional address and data bus 14. The processor bus interface 16 is connected to a memory interface 22 via a unidirectional address bus 18 and a bi-directional data bus 20. The memory interface 22, as its name implies, assists in storing and retrieving data with a 0-16 megabyte memory bank 30. The memory interface 22 is connected to the memory bank 30 via a bi-directional data bus 24, a uni-directional address bus 26, and a uni-directional module select bus 28. Closely associated with the memory bank 30 is a memory monitor 40 which is connected to the memory bank 30 via line 42 and to the memory interface 22 via line 44. The memory monitor 40 will inform the memory interface 22 if the current memory operation requires an access to a memory address which is larger than the memory installed in the system, as will be explained below.

Figure 2:
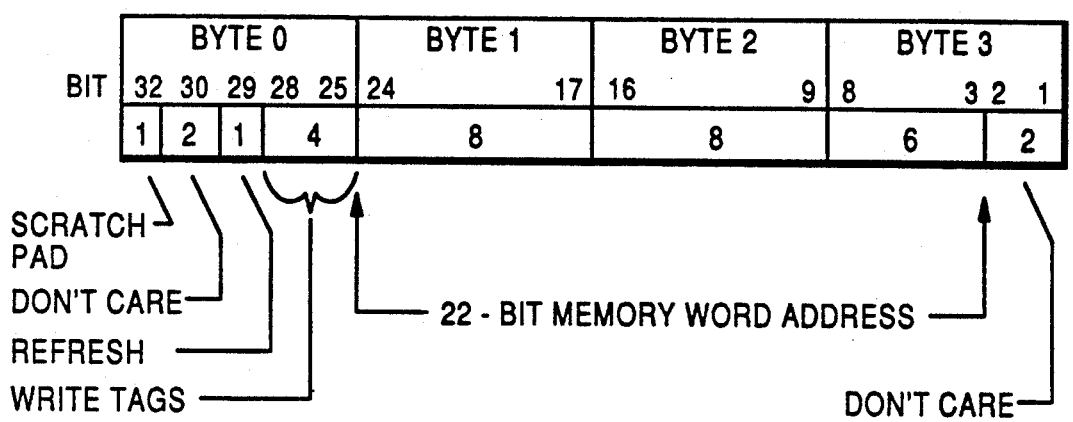
FIG. 2 is an illustration of an original allocation of the thirty-two bit address bus for a real memory operation.

The system 10 in the configuration shown in FIG. 1 has a maximum installed direct memory capacity of 16 million (binary million which equals $2^{20}$ or 1,056,784 in decimal notation) bytes which are organized as 4 million (binary) four byte words. The address bus 18 has thirty-two bus lines for various address and control functions. The address field which is used to directly address information words stored in real memory is twenty-two bits long, as shown in FIG. 2. As is well known in the art, twenty-two bits can address up to $2^{22}$ locations.

Referring to FIGS. 1 and 2, some important aspects relating to other information fields of each real memory access word will be described. The memory bank 30 is usually of the dynamic RAM VLSI type. Dynamic RAM must be periodically refreshed in order to maintain its contents. Each refresh operation is controlled by data bits 3-24, 25-28, and 29 of a respective real memory access word (illustrated by FIG. 2). Bit 29 of each real memory access word is the refresh control bit. When it is driven to an active low level by the processor 12, the line of bus 18 which corresponds to bit 29 is similarly driven to an active, low state, and a memory refresh cycle of part of the memory bank 30 is started.

The portion of memory 30 which is refreshed during this real memory refresh cycle corresponds to the row addressed by the twenty-two bit address field selected by the bus 18 (see FIG. 2 for the location of the address field). A counter in the processor 12 keeps track of the portion of the memory 30 to be refreshed next so that all of the memory 30 is periodically refreshed.

In addition to refreshing the memory 30, a periodic scrubbing of a part of real memory 30 is performed as part of each real memory refresh access. During each periodic scrubbing, a single four byte word is read from its memory location. Each four byte word has an error correcting code stored with it that is used to correct any single bit errors in its respective four byte word. The scrubbing process uses error correcting circuits and techniques that are known in the art and are not shown in the figures. After the four byte word has been scrubbed of any single bit error, it is written back to its location in the memory bank 30.

When bit 29 is at an inactive, high level, the real memory access is interpreted as an access to the RAM address location indicated by the memory word address bits 3-24, or a portion thereof. During a real memory access to RAM, bit 32, the scratch pad control bit, is at an inactive, high logic level. With bit 32 inactive, the character of the real memory access is controlled by the write tag field bits 15-28. A read operation is always performed as a thirty-two bit word transfer to the address location indicated by the twenty-two bit address field of the real memory access word during the next half of the bus cycle. To indicate a read operation, the write tag bits 25-28 are all inactive, high levels. During a write operation, on the other hand, one or more of the write tag bits 25-28 are active, low levels. Write operations are more flexible than read operations, since it is possible to disable the writing of data to any of the four bytes that make up the thirty-two bit word addressed by the twenty-two bit memory word address of bits 3-24. Bit 28 controls the writing of data to byte 3 of a four byte word location in real memory 30, and bits 27 through 25 control the writing to bytes 2 through 0, respectively.

Scratch pad memory (not shown) is a special memory for thirty-two bit words. Scratch pad memory may be indirectly addressed via registers within the processor 12 or literally addressed by the six least significant bits of the twenty-two bit address field shown in FIG. 2 (the remaining sixteen bits are don't cares during a scratch pad access). Bit 32, when at an active, low level, indicates that the current real memory access is to one of the locations in the scratch pad memory (not shown).

The scratch pad locations are associated with certain registers in the processor 12 in order to emulate memory stack operations. Because of the special indirect or literal addressing modes that are provided by the scratch pad memory, the slower and more complex partial store operations to write one to three bytes of a location are not used for scratch pad accesses. Thus, a scratch pad read access has the write tag bits 25-28 all as inactive high levels, and a scratch pad write access has write tag bits 25-28 all as active low levels.

Figure 3:
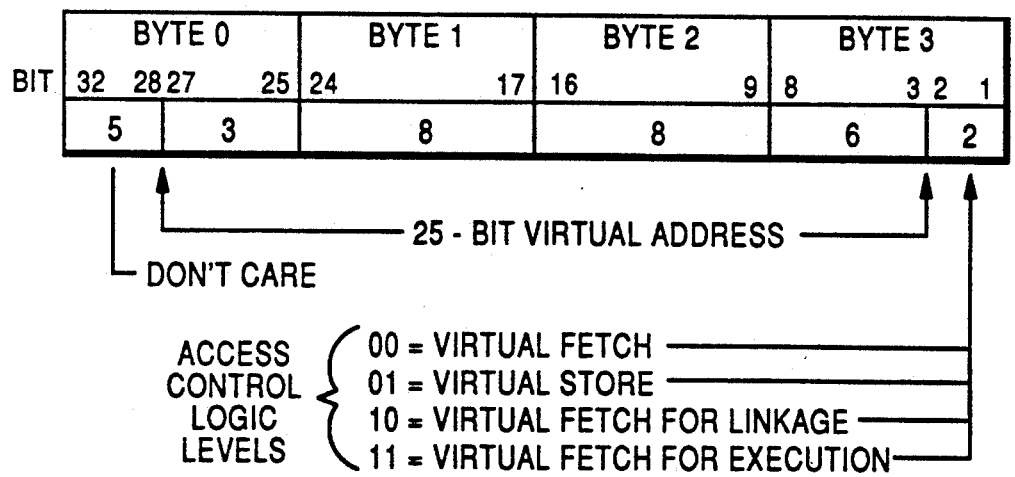
FIG. 3 is an illustration of an original allocation of the thirty-two bit address bus for a virtual memory operation.

Referring now to FIGS. 1 and 3, the system 10 also operates in a virtual memory addressing mode in which the system has twenty-five bit positions in its virtual address field. Those skilled in the art will appreciate that a twenty-five bit field may address $2^{25}$, or thirty-two million (binary) words. Since each location is a word having four bytes, the total virtual address capability is one hundred twenty-eight million (binary) bytes.

FIG. 3 shows an allocation of various control and information fields that are used for accessing a virtual memory address. The twenty-five bit virtual address described above occupies bits 3 through 27 of the thirty-two bit virtual memory access word.

When a virtual access has started, the virtual address is translated into a real address by part of the processor 12. This translation takes one system bus cycle. The result of the translation is a twenty-two bit real address comparable to that shown in FIG. 2 for a real address access word. Concurrently with the translation, each virtual address is compared to a list of virtual addresses in a real memory manager (not shown, but part of the processor 12). This list contains all of the virtual addresses that have already been translated and currently reside in the real memory banks 30. If the virtual memory address access word specified an address that already has been translated and that has been loaded into the real memory bank 30, the translated location is accessed within the next two bus cycles. If, however, the virtual address has not been translated and loaded, then memory space is made available by the processor 12 for the virtual address accessed, and typically the entire program that it is a part of. After space in the real memory banks 30 has been made, the virtual address accessed and its program are loaded into real memory from a main virtual storage device such as a magnetic disk.

Since the virtual memory main storage device in the NCR SYSTEM 10000 Model 75 is a non-volatile refresh data stored in virtual memory until it is loaded into real memory bank 30. Further, since nonvolatile media are less subject to environmentally induced single bit errors than dynamic RAMs, there is no need for a periodic scrubbing as there is with dynamic RAMs. Usually, virtual data is checked and corrected each time it is read into the memory bank 30 from nonvolatile storage. After the virtual data has been loaded into dynamic RAM locations of memory bank 30, it is subjected to refresh and scrubbing as the rest of the real memory locations.

Bits 1 and 2 of each virtual memory access word shown in FIG. 3 comprise a access control field. This field of two bits has four possible combinations which represent four different types of privilege of access. The privilege indicated by bits 1 and 2 must match a predetermined privilege code, if any, that was supplied with the program that is being accessed. If the access control logic levels are 00, a virtual fetch or read operation is performed to the location addressed by the virtual address field. If the access control logic levels are 01, a virtual store or write operation is performed to the location addressed by the virtual address field. If the access control logic levels are 10, a less privileged virtual fetch for linkage is performed. A virtual fetch for linkage is a read operation for the limited purpose of linking the data from the virtual location addressed with other data or other instructions. A Write operation to an address with such a access control code is not permitted to safeguard the data. If the access control logic levels are 11, a less privileged fetch for execution is performed. A virtual fetch for execution is a read operation for the limited purpose of executing the data from the virtual location addressed. This means that the data fetched or read is instruction data, and therefore write operations are not permitted since accidental write operations to the instruction portion of an application program could destroy the program. Furthermore, using the data fetched for any purposes other than execution purposes is not permitted because accidental use of instructions as data representing alphanumeric quantities can have erroneous results.

Bits 28 through 32 of each virtual memory access word are reserved for future expansion of the virtual addressing capability. So as far as the system shown in FIG. 1 is concerned, bits 28 through 32 are "don't care bits". This is illustrated in FIG. 3.

Figure 4:
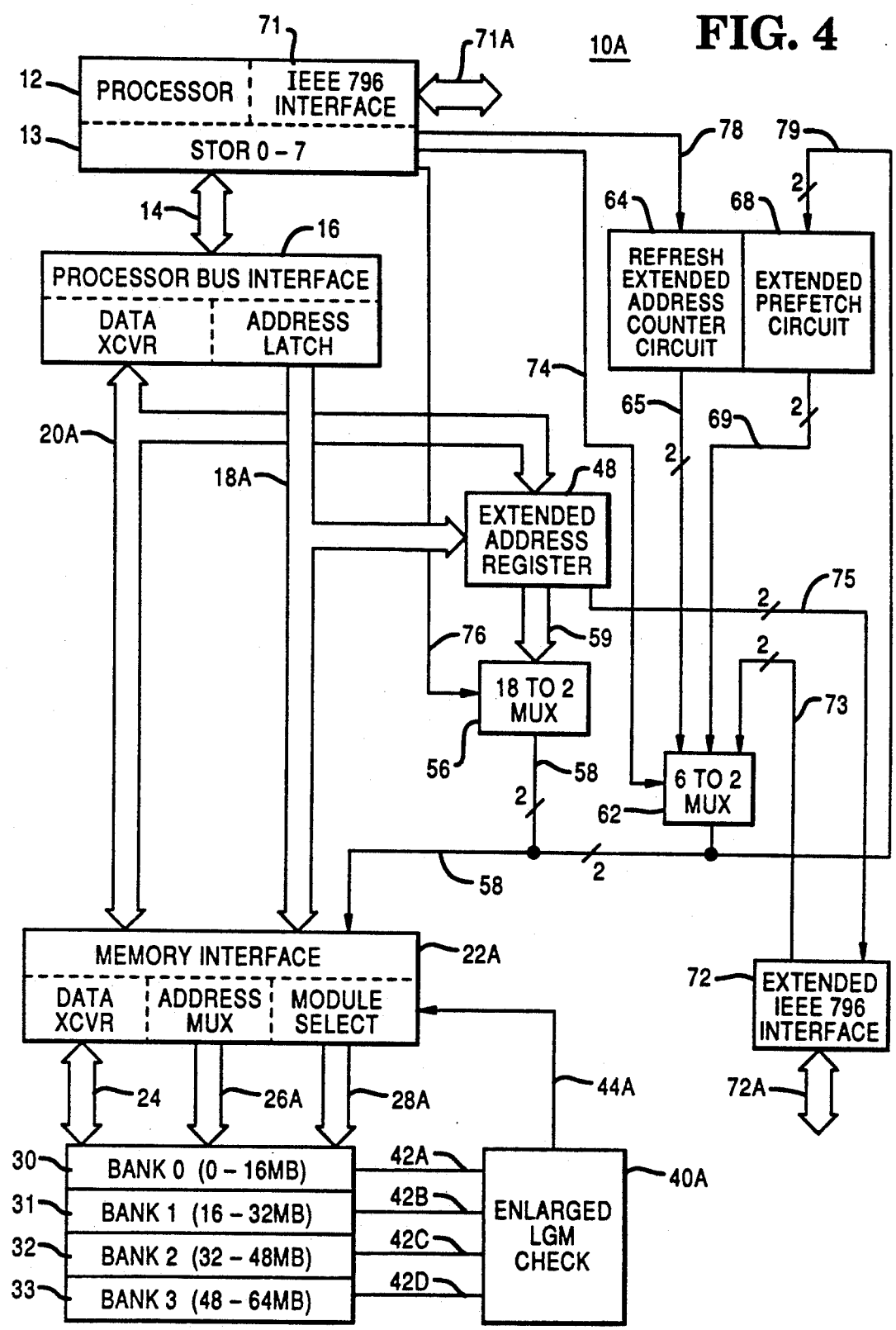
FIG. 4 is a simplified block diagram of an extended memory electronic data processing system.

Turning now to FIG. 4, one embodiment of the invention will be described. An extended memory system 10A is shown in FIG. 4. The system 10A has the same processor 12 as the NCR 10000 Model 75 shown in FIG. 1. In fact one of the advantages of the present invention is that it is not necessary to change the processor 12 and its associated VLSI chip set, described in the *NCR/32 GENERAL INFORMATION MANUAL*, in order to extend the real memory capability beyond the original 16 megabyte limit. The processor 12 is connected via a processor bus 14 to a processor bus interface 16. Both the processor bus 14 and the processor bus interface 16 are the same as the corresponding components of the NCR SYSTEM 10000 Model 75 shown in FIG. 1. The processor bus interface 16 is connected via an address bus 18A and a data bus 20A to an enlarged memory interface 22A. The address bus 18A and the data bus 20A are exactly like their counterparts of the NCR SYSTEM 10000 Model 75, except that both the address bus 18A and the data bus 20A have an additional parallel bus connection to an extended address register 48.

The extended address register 48 is a thirty-two bit register which is connected to the data bus 20A and controlled by the address bus 18A. The main purpose for addressing the extended address register 48 is to write data into it via the data bus 20A. As shown in FIG. 5, ten pairs of extended address bits (bits shown ending with the characters EX1 or EX2) may be written into the register 48. This thirty-two bit data word is selected by the operating system as the first step of each new application program and once it is written into the register 48, this data word allocates the address space of real memory in which the current application program will operate. The operation of these extended address bits will be explained below.

Referring again to FIG. 4, the memory interface 22A is connected to the address bus 18A and the data bus 20A, and as far as the memory interface 22A is concerned, the buses 18A and 20A are the same as the corresponding buses shown in FIG. 1. The memory interface 22A however, has some additional circuitry and capability beyond that of its counterpart shown in FIG. 1.

Memory interface 22A has two extended memory address bits supplied to it from the extended address register 48 via a combination of an eighteen bit bus 59, an eighteen-to-two multiplexer 56, and a two conductor extended address line 58. The two conductor extended address line 58 conducts two extended address bits to the memory interface 22A, where they are used to select one of up to four memory banks 30, 31, 32, and 33. Each memory bank 30-33 is the same as the memory bank 30 shown in FIG. 1, and stores up to 16 megabytes.

The two conductor extended address line 58 is also connected to a six-to-two multiplexer 62 which selects between two data bits from refresh extended address circuit 64 via two conductor line 65, extended prefetch circuit 68 via two conductor line 69, or extended IEEE 796 interface 72 via two conductor line 73. The six-to-two multiplexer 62 is controlled via a multi-conductor select line 74 from the processor 12. Potential contention conditions for the extended address line 58 are managed by the processor 12, which also controls the eighteen to two multiplexer 56 via a multi-conductor line 76. In this way, the extended memory interface 22A is provided with the address lines to select the proper bank for a real memory access, a virtual memory access, a refresh memory and scrubbing operation, a prefetch memory access, or an extended IEEE 796 address operation.

The IEEE 796 bus 71A which is used in the NCR SYSTEM 10000 Model 75, is extended in the present invention by the addition of two address lines which are operated separately from the existing IEEE 796 chip. The two additional bits are supplied to the extended IEEE 796 interface 72 from the extended address register 48 via two conductor line 75. From the extended IEEE 796 interface 72, the extended bits are transferred via a bus 72A along with the standard IEEE 796 bits when using bus 71A. Line 73 allows the extended IEEE 796 bus 72A to be used with the standard IEEE 796, bus 71A to access the extended memory interface 22A and the memory banks 30-33.

In this manner, essentially all of the operations that were available on the NCR SYSTEM 10000 Model 75 are available on this extended version, and except for the infrequent loading of the extended address register 48 by the allocated operating system, all of the transactions to the extended address are transparent to the rest of the system 10A, and to the user.

The memory banks 30-33 are connected via lines 42A, 42B, 42C, and 42D to an enlarged LGM checker 40A which instructs the memory interface 22A whenever an access is attempted to an address which is greater than the highest real memory address.

Operation

During typical operation, the processor 12 and its operating system will load the extended address register 48 with an extended address control word at the beginning of operations. Ten pairs of extended bits are loaded into the extended address register 48, and as long as there is sufficient memory for all of the applications, there is no need to change the control word in the extended address control register 48 again.

The NCR SYSTEM 10000 Model 75 typically operates in virtual mode, e.g., between eighty and ninety per cent of the time. The main focus, therefore, of the memory extension is to provide an extended number of real memory locations in which virtual data may be loaded and in which virtual applications may loaded and/or executed. By extending the real memory capability, the amount virtual applications and data that are swapped-in from nonvolatile memory and swapped-out to nonvolatile memory of virtual data and applications may be reduced and/or eliminated. Thus, most of the address extension circuitry is concerned with virtual operations. The extension of real memory locations transparently into a previously virtual address space is one of the new and unique features of the present invention. Another new and unique feature is that the extension can be achieved with a minimum number of changes or writes to the extended address register 48.

A virtual operation is initiated when the processor 12 activates a virtual transfer bit in its internal memory manager (not shown). When this virtual transfer bit is active, logic circuitry (not shown) or logical software examines the state of bits 25-27 of the current virtual memory access word (shown in FIG. 3) to determine which of the eight segment table origin registers 13 should be accessed to process the virtual memory address of the current virtual memory access word into a real memory address. Segment table origin registers 13 are registers that are also internal to the processor 12.

In each segment table origin register 13 is a respective location of an origin or beginning of a respective segment table, that is in real memory banks 30-33. The segment tables are updated in a known way as programs are loaded into real memory or loaded back into virtual memory for storage.

For the NCR SYSTEM 10000 Model 75, each segment table has entries for up to 4,096 pages of application programs, or data files. Each page contains 1,024 thirty-two bit words, which is the equivalent of 4,096 bytes. Therefore, the eight segment tables of this virtual system manage 32 million (binary) thirty-two bit words, or 128 million (binary) bytes. Even with the extension of the real memory banks 30-33 to a total of 64 million (binary) bytes, it is self evident that at any time approximately 64 million (binary) bytes are stored in virtual memory on a disk or similar media. The extension of the real memory banks 30-33 to 64 million (binary) bytes substantially reduces the amount of the virtual memory that is required to be on disk and thereby reduces the amount of swapping-in and swapping-out of programs and files between real memory banks 30-33 and the virtual memory storage device (not shown).

To keep track of the segment tables, as well as the extension of the real memory address field from twenty-two to twenty-four bits, requires an extension of the addresses stored in segment table origin registers 13. To achieve this, two extended address bits are predetermined for each application program for each segment table origin registers 13 to be accessed during the running of the application program. These eight pairs of extended address bits that are associated with a respective segment table origin registers 13 are loaded into register 48 (see FIG. 4) according to the format shown in FIG. 5. By carefully planning the predetermined assignment of the various applications and data files to the eight segments pointed to by segment table origin registers 13 and their associated extension bits, performance degrading changes to register 48 may be prevented.

The register 48 (shown in FIG. 4) has eight pairs of extended address bits, each for use with a respective segment table origin register 13. Each of these eight pairs of extended address bits are logically concatenated with a respective twenty-two bit address from the respective segment table origin register 13 by the memory interface 22A. Each concatenated address is used as a pointer to address its respective segment table used by the application program.

Since the NCR SYSTEM 10000 may be used as a multi-user system, where multiple application programs are time division multiplexed, the planning and allocation of the application programs to segment tables across multiplexed users should, as much as possible, have consistent assignments of extended address bits in the extended address register control words. This prevents a reloading of register 48 with each multiplexed user.

Segment table origin registers 13 map bits 25-27 of each virtual address access word (see FIG. 3) to one of the four banks 30-33 (see FIG. 4) of extended real memory via the segment tables. One of many possible examples of an allocation of the segment table origin registers 13 to the various combination of bits 25-27 of the virtual address are shown in the following table:

| MSB | STOR | Ex2,Ex1 | (Bank) |
| --- | --- | --- | --- |
| 000 | 0 | 0,0 | 30 |
| 001 | 1 | 0,0 | 30 |
| 010 | 2 | 0,1 | 31 |
| 011 | 3 | 0,1 | 31 |
| 100 | 4 | 1,0 | 32 |
| 101 | 5 | 1,0 | 32 |
| 110 | 6 | 1,1 | 33 |
| 111 | 7 | 1,1 | 33 |

Also shown in the above table are predetermined assignments of segment table origin registers 13 to one of the four memory banks 30-33 indicated by the respective Ex2,Ex1 extension bits. The extended address bits may be selected according to individual system needs by appropriate allocations in the operating system program.

If the address space requirements of the application programs and data storage becomes too large relative to the real memory available in the extended banks 30-33, it is contemplated that the extension may be taken one address extension bit further which would increase the number of memory banks to eight and increase the real memory capacity to 128 megabytes. In this further contemplated system, the mapping could be direct, and no longer an eight to four allocation. This would make the extended memory banks 30-33 even more effective and increase virtual system performance even more.

Which of the segment table origin registers 13 to be utilized by an application program that is stored in virtual memory, is determined by the predetermined allocation for the program, mentioned previously, and the extended address bits for the program selected by a signal from the processor 12 to the eighteen-to-two multiplexer 56 via multiconductor line 76. The best virtual system performance occurs when the processor 12 merely switches between extended address bit values already existing within register 48, because the selection may be made without additional machine cycles that it would take to write a new extended address control word into register 48.

To maintain performance at least at previous levels, the prefetch operation which is used on the non-extended NCR SYSTEM 10000, must also be available for use on the extended system. Thus, an extended prefetch circuit 68 is included in the expanded system 10A.

The prefetch operation uses the previous access address as a reference to provide the next most likely address to be accessed, i.e. the next incremental address. The prefetched address is a preselected relative numerical distance from the address of the previous access. In the NCR System 10000 Model 75, this numerical distance at the end of a series of prefetches is limited by a maximum of 4 thousand (binary). This means that the extended prefetch bits in the extended prefetch circuit 69, which are the two most significant bits of the extended address, cannot change more than one digit during any one series of prefetches. This allows for a fairly straight forward extended prefetch circuit 68 which is just a two bit extension of that which already exists within the processor 12. This extended prefetch circuit 68 is connected by a multi-conductor line 79 to the output 58 of the eighteen to two multiplexer 56 which always has the two most significant bits of the reference address when a prefetch series of accesses is in process. From the extended prefetch circuit 68, the extended prefetch bits are supplied to the memory interface 22A via line 58. Therefore, prefetch accesses are provided in the extended multi-memory bank system 10A as it is in the previous non-extended system.

Real memory accesses have only one pair of extended address bits in the register 48. Usually these bits will be assigned to value 00, which corresponds to memory bank zero. This maintains the areas allocated for data and file manipulation to the same logical locations as in a nonextended system. Those skilled in the art will recognize that the potential exists for locating the data and file manipulation functions to some other area of real memory than bank zero should the need arise, but in order for the extended system to be upwardly compatible with the non-extended systems that potential is not currently used.

The refresh extended address circuit 64 operates in addition to the nonextended refresh circuitry (not shown) to refresh the three added banks of extended memory. The nonextended refresh circuitry (not shown) is essentially a counter in processor 12. The refresh extended address circuit 64 is connected to the nonextended counter (not shown) of the processor 12 via line 78 connected therebetween, and essentially provides two additional high order bits for the nonextended counter (not shown). The two bit output of the refresh extended address circuit 64 is connected to the six-to-two multiplexer 62, where the extended refresh bits are multiplexed to the memory banks 30-33 under control of the processor 12.

The IEEE 796 bus that the NCR SYSTEM 10000 uses as a backpanel and I/O bus has a standard limit of twenty-four address lines for addressing $2^{22}$ thirty-two bit words or sixteen million (binary) bytes. These correspond to the bits 3 through 24 of the real memory access word. The least significant bits 1 and 2 are not used and are "don't cares". In an extended memory system, however, the IEEE 796 bus system must be extended also in order to allow access to all of the memory banks 30-33 via the extended IEEE 796 bus. Furthermore, to allow the processor 12 to perform a turn-around diagnostic test over the extended address space, the extended address register 48 must transfer two extended bits to the extended IEEE 796 interface 72. The extended IEEE 796 interface 72 also supplies the extended bits during an IEEE 796 memory access while the standard portion of the IEEE 796 bus (not shown) supplies the lower 22 bits of the address. In all cases of extended IEEE 796 interface usage, the six-to-two multiplexer 62 must select the two extended bits under the control of the processor 12.

Figure 6A:
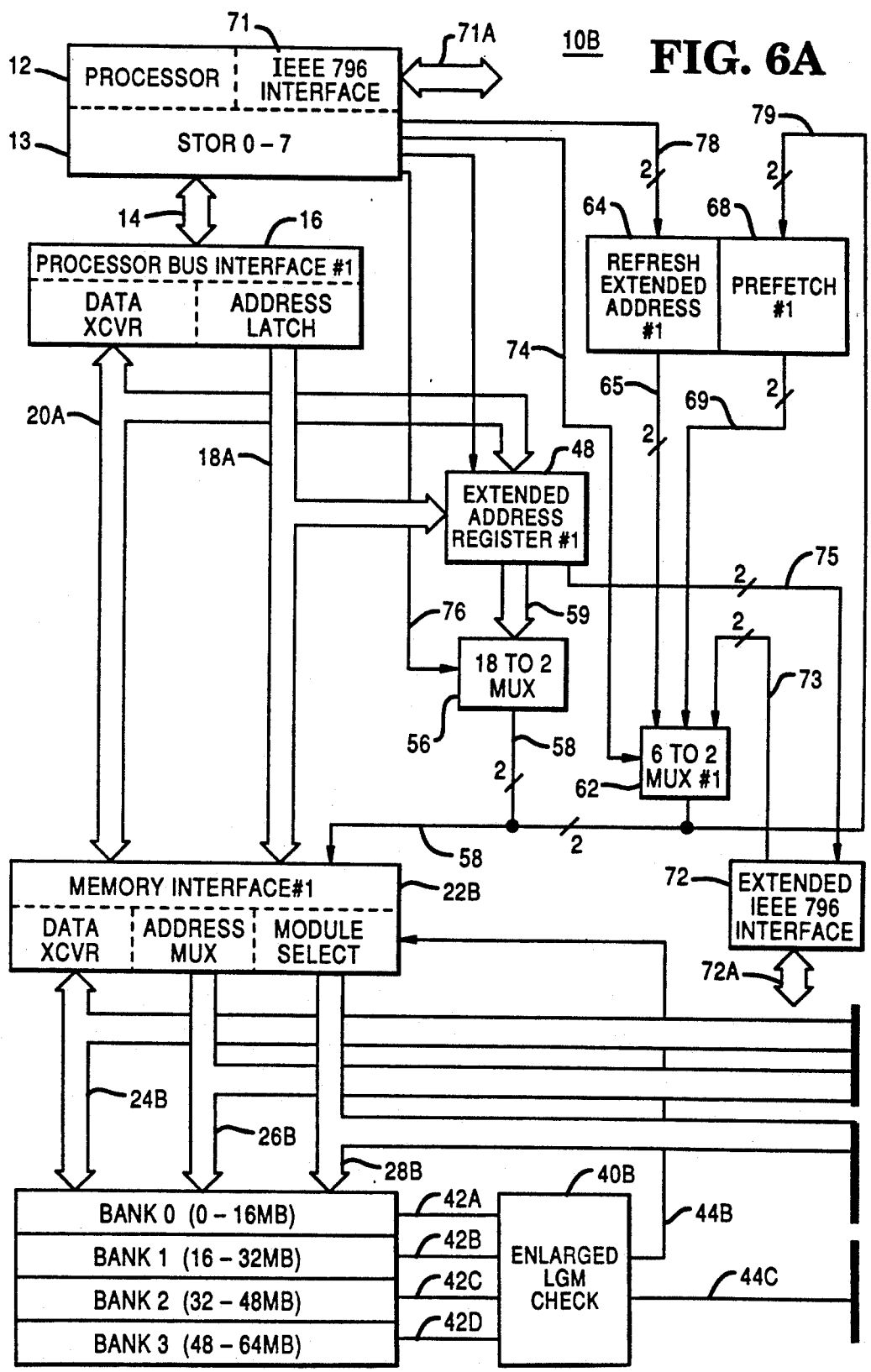
FIGS. 6A and 6B when joined together form a simplified block diagram of a dyadic, extended memory electronic data processing system.
Figure 6B:
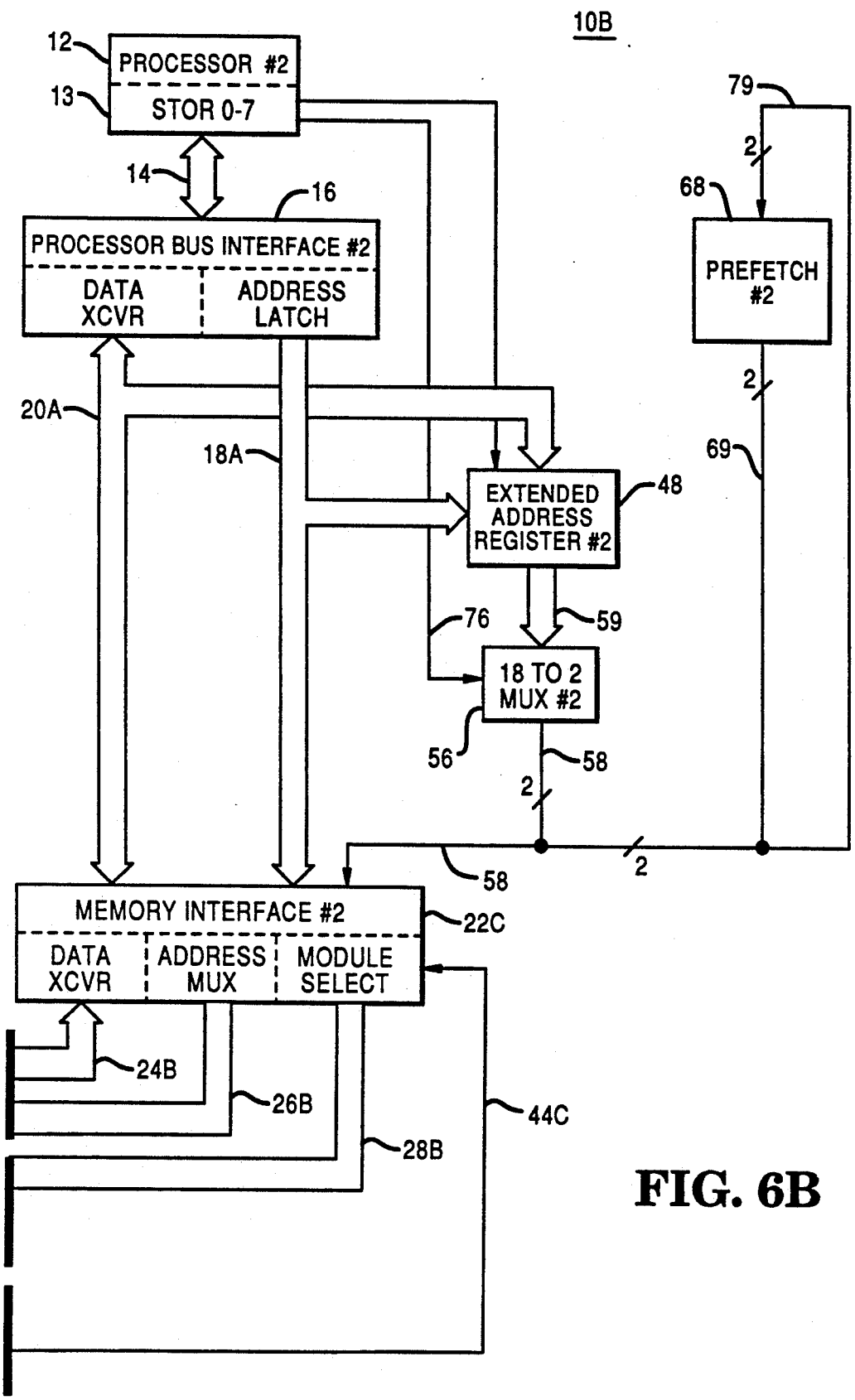

FIGS. 6A and 6B show a dyadic system 10B which corresponds to the system 10A (shown in FIG. 4), but has two processors 12 that operate with the extended memory banks 30-33. Processor #1 and its associated circuits which connect it to the extended memory banks 30-33 are identical with processor #2 and its associated circuits, except that processor #1 is given sole control of the extended IEEE 796 bus and the memory refresh circuits. Thus, processor #2 does not have a refresh extended addresses circuit or an extended IEEE 796 interface circuit associated with it.

Essentially everything shown in FIG. 4 is the same as shown in FIGS. 6A and 6B, and therefore, most circuits are duplicated. The operation of the dyadic system with extended memory banks 30-33 is essentially the same as the operation of a single processor system described previously. However, the dyadic processors, with programming to allow them to operate in parallel is the most effective use of the extended memory banks 30-33.

Thus, it will now be understood that there has been disclosed an extended memory circuit apparatus which provides a larger real memory by adding banks of real memory. In the extended system, the entire memory is still refreshed and scrubbed as the previously nonextended system. Further, prefetch operations and IEEE 796 transactions may be made with the extended memory in a manner that is transparent to the applications programs of the machine.

It will be clear to those skilled in the art that the present invention is not limited to the specific embodiments disclosed and illustrated herein. Nor is the invention limited to only two extended address bits. Rather, the invention may be applied equally to three or more extended address bits and resulting in a eight or higher power of two multiplication in the amount of extended memory which may be used according to the present invention.

Numerous modifications, variations, and full and partial equivalents can be undertaken without departing from the invention as limited only by the spirit and scope of the appended claims.

What is claimed as new and desired to be secured by Letters Patent of the United States is:

1. A memory expansion apparatus for a system having an extended main memory, said apparatus comprising:
   a processor accessing an address location in extended main memory, said processor is connected to an address-and-data bus, and to a control bus;
   a processor bus interface is also connected to said address-and-data bus, said processor bus interface also is connected to a non-extended address bus, and a data bus, said processor bus interface receives a first plurality of address bits from said processor, corresponding to the address location in extended memory which first plurality of address bits is outputted to said non-extended address bus;
   external register means for storing an extended address control word connected to said processor bus interface via said non-extended address bus at an address input port, and to said data bus at a data input/output port of said external register means;
   extended address selector means connected to said external register means for selecting a plurality of extended address bits from said extended address control word according to the extended address location in extended memory being accessed by said processor, said plurality of extended address bits are outputted from said extended address selector means to an extended address bus;
   memory interface means, connected to said non-extended address bus, said data bus, and said extended address bus, for receiving said first plurality of address bits and said extended address bits, concatenating said extended address bits and said first plurality of address bits, and accessing said extended address location in said extended main memory;

said extended main memory is of a dynamic random access type that requires periodic refreshing in order to maintain digital information stored therein; and extended counter means for providing an extended refresh address for refreshing said extended main memory, said counter means is connected to said processor by a second control bus.

2. The memory expansion apparatus for the system according to claim 1, further comprising means connected to an Input/Output bus to said extended address selector means for providing extended address bits to select a location in extended main memory according to a current address on said Input/Output bus.

3. The memory expansion apparatus for the system according to claim 2 wherein:

the Input/Output bus is a superset of an IEEE 796 bus;

said superset of said IEEE 796 bus having a number of address lines in addition to the address lines of said IEEE 796 bus.

4. An apparatus to address an extended real memory location in a virtual memory system having an extended real memory, said apparatus comprising:

a processor for processing a virtual address connected to an address-and-data bus;

said processor having a memory management means for translating said virtual address to real address bits;

a processor bus interface is also connected to said address-and-data bus for communicating time division multiplexed address and data bits with said processor over said address-and-data bus;

said processor interface connected to an address bus, a data bus, and a control bus;

external register means for storing an extended address control word from said data bus, said external register means is connected to said address bus at an address input port, to said data bus at a data input/output port, and to an extended address output bus;

extended address selector means connected to said processor via a second control bus and to said external register means via said extended address output bus for selecting a plurality of extended address bits from said extended address control word according to said virtual address;

said plurality of extended address bits connected to an extended address bus; and memory interface means, connected to said address bus, said data bus, and said extended address bus, for accessing an extended address location in the extended real memory corresponding to said virtual address.

5. The apparatus according to claim 4, further comprising:

extended counter means for providing an extended refresh address for refreshing dynamic memory of the extended real memory, said extended counter means connected to said processor by said second control bus; and multiplexer means for connecting said extended counter means to the extended real memory.

6. The apparatus according to claim 5 wherein said multiplexer means under processor control according to a predetermined mapping provides a connection for a plurality of extended address lines to said extended real memory via said memory interface means.

7. The apparatus according to claim 1, wherein said extended address control word has a plurality of fields to select any one of a plurality of memory banks according to said virtual address without changing said extended address control word stored in said external register means.

8. The apparatus according to claim 4, further comprising means connected to an Input/Output bus connected to said extended address selector means for transferring extended address bits to select any one of a plurality of memory banks according to an address on said Input/Output bus.

9. The apparatus according to claim 8 wherein:

said Input/Output bus is a superset of an IEEE 796 bus;

said superset of said IEEE 796 bus having a number of address lines in addition to a standard plurality of address lines of said IEEE 796 bus.

10. The apparatus according to claim 4, wherein said extended address control word has a plurality of fields to select any one of said plurality of memory banks according to said virtual address without changing said extended address control word stored in said external register means.

* * * * *